United States Patent [19]
Goda et al.

[11] Patent Number: 5,326,720
[45] Date of Patent: * Jul. 5, 1994

[54] METHOD FOR PRODUCING SILICON DIOXIDE FILM WHICH PREVENTS ESCAPE OF SI COMPONENT TO THE ENVIRONMENT

[75] Inventors: Takuji Goda, Sagamihara; Yasuto Sakai, Takarazuka; Akihiro Hishinuma, Nishimomiya; Hideo Kawahara, Kawanishi; Shigehito Deki, Kobe, all of Japan

[73] Assignee: Nippon Sheet Glass Co., Ltd., Osaka, Japan

[*] Notice: The portion of the term of this patent subsequent to Oct. 6, 2009 has been disclaimed.

[21] Appl. No.: 861,892
[22] PCT Filed: Oct. 25, 1990
[86] PCT No: PCT/JP90/01380
  § 371 Date: Jun. 23, 1992
  § 102(e) Date: Jun. 23, 1992
[87] PCT Pub No: WO92/07793
  § PCT Pub Date: May 14, 1992
[51] Int. Cl.$^5$ .............................. B05D 1/18
[52] U.S. Cl. .............. 437/130; 148/DIG. 101; 423/335; 427/430.1; 427/169
[58] Field of Search ............. 423/335, 339; 427/169, 427/345, 443.2, 430.1; 437/130, 120; 148/DIG. 101

[56] References Cited

U.S. PATENT DOCUMENTS

| | | | |
|---|---|---|---|
| 2,505,629 | 4/1950 | Thomsen et al. | 117/124 |
| 4,468,420 | 8/1984 | Kawahara et al. | 427/397.7 |
| 5,073,408 | 12/1991 | Goda et al. | 427/169 |
| 5,132,140 | 7/1992 | Goda et al. | 427/169 |
| 5,153,035 | 10/1992 | Sakai et al. | 427/430.1 |

FOREIGN PATENT DOCUMENTS

| | | |
|---|---|---|
| 435463 | 12/1910 | France . |
| 57-196744 | 12/1982 | Japan . |
| 60-33233 | 2/1985 | Japan . |
| 60-176947 | 9/1985 | Japan . |
| 61-281047 | 12/1986 | Japan . |
| 62-20876 | 1/1987 | Japan . |
| 63-102738 | 7/1988 | Japan . |
| 64-17871 | 1/1989 | Japan . |
| 64-28377 | 1/1989 | Japan . |
| 2-289414 | 11/1990 | Japan . |

*Primary Examiner*—Robert Kunemund
*Assistant Examiner*—Ken Horton
*Attorney, Agent, or Firm*—Varndell Legal Group

[57] ABSTRACT

A method for producing a silicon dioxide film by contacting a substrate such as glass with a treating liquid comprising a hydrosilicofluoric acid solution supersaturated with silicon dioxide to deposit a silicon dioxide film on the surface of the substrate, the method being characterized by providing a device for preventing an Si component from escaping from the treating liquid. According to the method, pollution of working environment and decrease in concentration of solution do not occur during the formation of silicon dioxide film.

7 Claims, 1 Drawing Sheet

METHOD FOR PRODUCING SILICON DIOXIDE FILM WHICH PREVENTS ESCAPE OF SI COMPONENT TO THE ENVIRONMENT

TECHNICAL FIELD

The present invention relates to a method for producing silicon dioxide film, and more particularly to an improved method for producing a silicon dioxide film on the surface of a substrate by contacting the substrate with a treating liquid comprising a hydrosilicofluoric acid solution supersaturated with silicon dioxide.

Conventionally, as a method for forming a silicon dioxide film, there is known a method wherein a silicon dioxide film is formed on the surface of a substrate by dipping the substrate such as glass into an aqueous solution of hydrosilicofluoric acid supersaturated with silicon dioxide (hereinafter referred to as deposition method) (for example, Japanese Unexamined Patent Publication Nos. 196744/1982, 281047/1986 and 20876/1987). For increasing the film deposition rate in the deposition method, it is effective to increase the feed rate of a material or heat energy which accelerates the decomposition of hydrosilicofluoric acid as the treating liquid. However, it is known that if the feed rate is too fast, silicon dioxide particles are produced in the treating liquid and the film deposition rate is rather decreased. This means that the film forming efficiency represented by a ratio of (the amount of silicon dioxide film formed)/(the amount of material or heat energy which accelerates decomposition of hydrosilicofluoric acid) (hereinafter referred to as film forming efficiency) is decreased. In order to inhibit generation and growth of silicon dioxide particles and to increase the film deposition rate (namely, to increase the film forming efficiency), it is known to continuously feed the material or heat energy which accelerates decomposition of hydrosilicofluoric acid, and to circulate a part of the treating liquid so as to filter out silicon dioxide particles (hereinafter referred to as improved method 1) (for example, Japanese Unexamined Patent Publication Nos 33233/1985 and 102738/1988).

Also, as a manner of forming a dense silicon dioxide film in the above-mentioned deposition method, there are known a method wherein a silicon dioxide film is formed at a high temperature of treating liquid (hereinafter referred to as improved method 2) (for example, Japanese Patent Application No. 184569/1987); and a method wherein a high concentration of hydrosilicofluoric acid solution is used as the treating liquid (hereinafter referred to as improved method 3) (for example, Japanese Patent Application No. 174561/1987).

However, the film deposition rate obtained by the improved method 1, is from about 30 to about 100 nm/h, although it varies somewhat depending on the treating conditions, so it is not sufficient from the industrial point of view. Further, even in the improved method 1, generation of silicon dioxide particles occurs, so the film forming efficiency is not necessarily enough.

In the improved methods 2 and 3, Si components (presumed to be $H_2SiF_6$ or $SiF_4$) evaporate vigorously from the treating liquid, so silicon dioxide particles deposit at the interface between the treating liquid and the atmosphere, or to the wall of a vessel at the positions above the surface of the treating liquid. These silicon dioxide particles are estimated to be originally a part able to form a silicon dioxide film in the treating liquid, but escape into the atmosphere, so that there arises a problem that the film forming efficiency decreases. In addition, the evaporation of the treating liquid into the atmosphere is undesirable because the working environment is polluted.

DISCLOSURE OF THE INVENTION

The present invention has been made in order to solve the above-mentioned problems. The present invention relates to a method for producing a silicon dioxide film by contacting a substrate with a treating liquid comprising a hydrosilicofluoric acid solution supersaturated with silicon dioxide and depositing a silicon dioxide film on the surface of the substrate, wherein a means for preventing an Si component from escaping from the treating liquid is provided.

One of the means for preventing the Si component escape from the treating liquid is to form an Si component escape preventing layer at the interface between the treating liquid and the atmosphere. As the means for forming the Si component escape preventing layer at the interface between the treating liquid and the atmosphere, it may be adopted to fill the treating liquid in a closed vessel, or to float a solid material on the surface of the treating liquid. However, there is preferred a method wherein a liquid material having a low reactivity with the treating liquid and a lower specific gravity than the treating liquid is floated, since it is simple and is able to cover the entire interface between the treating liquid and a gas.

The liquid materials are not particularly limited so long as the reactivity thereof with the treating liquid is low and the specific gravity thereof is lower than that of the treating liquid. For example, aliphatic hydrocarbons represented by the general formula: $C_nH_{2n+2}$ wherein n is from 4 to 31 can be used. In practice, the liquid materials are suitably selected in consideration of the temperature of the treating liquid at which the present invention is practiced, the melting point and boiling point of the liquid materials and the vapor pressure of the liquid materials at the temperature of the treating liquid.

There is no particular limitation in the method for preparing the treating liquid comprising the hydrosilicofluoric acid solution supersaturated with silicon dioxide. For example, there can be adopted a method in which a substance capable of accelerating the decomposition of hydrosilicofluoric acid, e.g. $H_3BO_3$ or Al, is added to a solution of hydrosilicofluoric acid approximately saturated with silicon dioxide, or a method in which the temperature of the hydrosilicofluoric acid solution approximately saturated with silicon dioxide is raised.

There is no particular limitation in the substrates applied to the present invention. Any materials which are hard to cause undesirable reaction with the treating liquid, e.g. various kinds of glasses such as alkali metal-containing glass, silica glass and non-alkali glass; various kinds of ceramics; various kinds of semiconductors such as silicon semiconductor and gallium arsenide semiconductor.

According to the present invention, evaporation of Si component (assumed to be $H_2SiF_6$ or $SiF_4$) from the treating liquid can be prevented, since the interface between gas and the treating liquid comprising hydrosilicofluoric acid supersaturated with silicon dioxide is eliminated. As a result, the film forming efficiency is extremely increased, and the film deposition rate is also increased. In particular, the present invention is effective for the cases where the evaporation of Si component from the treating liquid is vigorous, for example, when the concentration of hydrosilicofluoric acid in the treating liquid is high; when the temperature of the treating liquid is high; or when a high film deposition rate is desired.

BEST MODE FOR CARRYING OUT THE INVENTION

Figure 1:
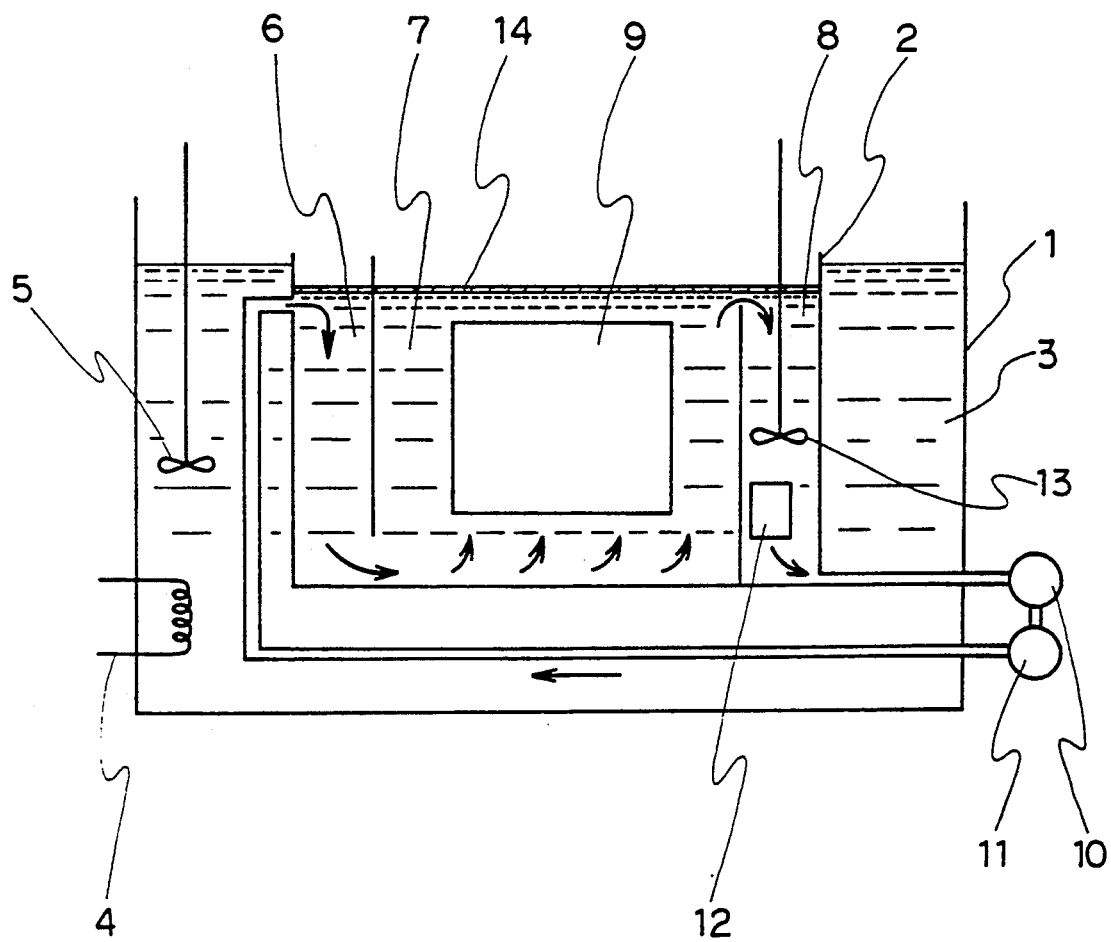
FIG. 1 is an illustrative view of a silicon dioxide film forming apparatus employed in Examples of the present invention.

The present invention is explained below in detail by means of Examples with reference to the accompanying drawing. The Examples explained herein show cases where $C_7H_{16}$ (heptane) is used as a material having ga lower specific gravity than the treating liquid.

EXAMPLE 1

A silicon dioxide film was formed on a soda-lime glass having a size of 100 mm in length, 100 mm in width and 1.1 mm in thickness, using a silicon dioxide film forming apparatus shown in FIG. 1, according to the following procedures.

The silicon dioxide film forming apparatus comprised an outer tank 1 and an inner tank 2, wherein the space between the inner tank 2 and the outer tank 1 was filled with water 3. In this Example, the temperature of water was adjusted at 35° C. by a temperature controller 4.

Water 3 was stirred by stirrer 5 in order to make the temperature of water 3 uniform. The inner tank 2 comprised front part 6, intermediate part 7 and rear part 8, and each part was filled with 6 liters of a 2 moles/liter aqueous solution of hydrosilicofluoric acid saturated with dissolved silica-gel powder as a treating liquid.

At first, a circulation pump 10 was operated in order to start circulation of the treating liquid where the treating liquid was pumped out at a constant rate from the rear part 8 of inner tank 2, filtered with a filler 11, and returned into the front part 6. Thereafter, three Al plates having a size of 50 mm in length, 50 mm in width and 3 mm in thickness were dipped into the rear part 8 for 10 hours. As a result, a treating liquid comprising a hydrosilicofluoric acid solution supersaturated with silicon dioxide (degree of supersaturation about 110%) was obtained.

In the drawing, numeral 13 is a stirrer.

Herein, the absolute exclusion limit of the filter 11 was set at 1.5 μm (it meant no passing through of particles exceeding 1.5 μm) and the circulating rate of the treating liquid was set at 500 ml/minute (since the whole amount of the treating liquid was 6 liters, the circulation rate was about 8%/minute), and heptane 14 was floated on the surface of the treating liquid in order to remove the interface between the treating liquid and the gas.

Thereafter, soda-lime glass 9 was dipped vertically into the intermediate part 7 of the inner tank. Under the above-mentioned conditions (dipping of three Al plates 12 of 50 mm length, 50 mm width and 3 mm thickness in the rear part 8 of the inner tank, circulation at a rate of 8%/min, and filtration with filter having an absolute exclusion limit of 1.5 μm), the soda lime glass 9 was kept for 8 hours.

After the completion of the treatment, there was observed no particles of silicon dioxide at the interface between the treating liquid and heptane 14, the interface between heptane 14 and the atmosphere, and on the wall of the vessel over the treating liquid level.

The amount of Al dissolved during the 8 hour treatment was 3.18 g, and the thickness of the silicon dioxide film obtained by the above treatment was about 678 nm. Accordingly, the average film deposition rate is about 85 nm/hour, and the film deposition efficiency represented by the ratio of (amount of silicon dioxide film formed)/(amount of fed material or heat energy capable of accelerating decomposition of hydrosilicofluoric acid; in case of this example, amount of dissolved Al) is calculated to be 0.0231 $nm/mm^2$ g.

COMPARATIVE EXAMPLE 1

Using the same apparatus as in Example 1, a treating liquid comprising a hydroslicofluoric acid solution supersaturated with silicon dioxide (degree of supersaturation about 110%) was obtained.

Herein, the absolute exclusion limit of the filter 11 was set at 1.5 μm, and the circulating rate of the treating liquid was set at 500 ml/minute (since the whole amount of the treating liquid was 6 liters, the circulation rate was about 8%/minute). However, no material was floated on the surface of the treating liquid so that the treating liquid contacted the atmosphere directly.

Thereafter, the above-mentioned soda-lime glass was vertically dipped into the intermediate part 7 of the inner tank. Under the above-mentioned conditions (dipping of three Al plates 12 of 50 mm length, 50 mm width and 3 mm thickness in the rear part 8 of the inner tank, circulation at a rate of 8%/minute and filtration with filter having an absolute exclusion limit of 1.5 μm), the soda lime glass 9 was kept for 8 hours.

After the completion of the treatment, there was observed a slight amount of silicon dioxide particles at the interface between the treating liquid and the atmosphere and on the wall of the vessel above the treating liquid level.

The amount of Al dissolved during the 8 hour treatment was 1.98 g, and the thickness of the silicon dioxide film obtained by the above treatment was about 405 nm. Accordingly, the average film deposition rate is about 51 nm/hour, and the film forming efficiency represented by the ratio of (amount of formed silicon dioxide film)/(amount of fed material or heat energy capable of accelerating decomposition of hydrosilicofluoric acid; in case of this example, amount of dissolved Al) is calculated to be 0.0205 $nm/mm^2$ g.

EXAMPLE 2

A treating liquid was prepared by cooling an aqueous solution of hydrosilicofluoric acid having a concentration of 3.8 moles/liter to −3° C. and dissolving silicon dioxide (industrial silica-gel) therein up to saturation.

In four vessels were placed 100 ml portions of the treating liquid, and a soda-lime glass plate of 50 mm length, 25 mm width and 1.1 mm thickness was dipped into each vessel. Heptane 14 was then floated on the surface of the treating liquid in each vessel. The vessels were immediately heated to 35° C., and kept for 3 hours, 6 hours, 16 hours and 24 hours, respectively. Thereafter, the thickness of silicon dioxide films deposited on the glass plates was measured.

The results are shown in Table 1. It is found that the thickness of silicon dioxide film increases in rough proportion to the dipping time that the soda-lime glasses was kept in the treating liquid.

TABLE 1

| Dipping time of substrate (hour) | Film thickness (nm) | Average film deposition rate (nm/hour) |
| --- | --- | --- |
| 3 | 268 | 89.5 |
| 6 | 594 | 99.0 |
| 16 | 1450 | 90.6 |
| 24 | 1877 | 78.2 |

Also, there was observed no particles of silicon dioxide at the interface between the treating liquid and heptane 14, the interface between heptane 14 and the atmosphere, and on the wall of the vessels over the treating liquid level.

COMPARATIVE EXAMPLE 2

Silicon dioxide films were formed on soda-lime glass plates in the same manner as in Example 2 except that heptane 14 was not floated on the surface of the treating liquid so that the treating liquid contacted directly with the atmosphere.

The results are shown in Table 2. In case of 6 hour treatment, there is no clear difference in the silicon dioxide film thickness between Example 2 and Comparative Example 2. However, in the treatment exceeding 16 hours, the film thickness did not increase so much, and the film thickness obtained in 16 hour treatment was only about 40% of that of Example 2, and the film thickness obtained in 24 hour treatment was only about 35% of that of Example 2.

Also, after the completion of the treatment, there were observed silicon dioxide particles at the interface between the treating liquid and the atmosphere and on the wall of the vessel over the treating liquid level. In particular, a large quantity of silicon dioxide particles was produced in 16 hour treatment and 24 hour treatment.

TABLE 2

| Dipping time of substrate (hour) | Film thickness (nm) | Average film deposition rate (nm/hour) |
| --- | --- | --- |
| 3 | 280 | 93.4 |
| 6 | 487 | 81.1 |
| 16 | 584 | 36.5 |
| 24 | 650 | 27.1 |

INDUSTRIAL APPLICABILITY

According to the present invention, it is possible to remarkably increase the film forming efficiency and also to increase the film deposition rate. Therefore, since it is possible to decrease the feed amount of a material or heat energy which accelerates decomposition of hydrosilicofluoric acid, a benefit that manufacturing cost becomes low is obtained.

Further, since evaporation of Si component (presumed to be $H_2SiF_6$ or $SiF_4$) from the treating liquid is prevented and whereby silicon dioxide particles are prevented from being produced outside the treating liquid, the method of the present invention has the effect that pollution of the working environment owing to the evaporated Si component and decrease in yield of products are prevented.

We claim:

1. A method for producing a silicon dioxide film which comprises contacting a substrate with a treating liquid comprising a hydrosilicofluoric acid solution supersaturated with silicon dioxide to deposit a silicon dioxide film on the surface of a substrate, the method being characterized in that a means for preventing an Si component from escaping from the treating liquid is provided.

2. The method of claim 1, wherein the means for preventing Si component from escaping from the treating liquid is to form an Si component escape preventing layer at the interface between the treating liquid and a gas.

3. The method of claim 2, wherein the Si component escape preventing means is to float on the treating liquid a liquid material having a low reactivity with the treating liquid and a lower specific gravity than the treating liquid.

4. A method for producing a silicon dioxide film which comprises contacting a substrate with a treating liquid comprising a hydrosilicofluoric acid solution supersaturated with silicon dioxide and depositing a silicon dioxide film on a surface of said substrate, said method including a means for preventing an Si component contained in said treating liquid from escaping therefrom.

5. The method of claim 4, wherein said means includes forming a barrier between said treating liquid and a gas above said treating liquid, said barrier preventing said Si component from passing therethrough.

6. The method of claim 4, wherein said means includes floating a liquid material on said treating liquid, said liquid material having a low reactivity with said treating liquid and a specific gravity lower than that of said treating liquid.

7. The method of claim 6, wherein said treating liquid is an aliphatic hydrocarbon.

* * * * *